Patented Apr. 29, 1924.

1,492,302

UNITED STATES PATENT OFFICE.

JOHN R. MacMILLAN, OF LA SALLE, NEW YORK, ASSIGNOR TO NIAGARA ALKALI COMPANY, OF NIAGARA FALLS, NEW YORK, A CORPORATION OF NEW YORK.

ELECTRODE.

No Drawing.    Application filed May 12, 1922.   Serial No. 560,470.

*To all whom it may concern:*

Be it known that I, JOHN R. MACMILLAN, a citizen of the United States, residing at La Salle, in the county of Niagara and State of New York, have invented certain new and useful Improvements in Electrodes, of which the following is a specification.

This invention relates to electrodes; and it comprises a carbon electrode containing electrically conductive dehydrated $Fe_3O_4$ within its pores and a process of making such an electrode wherein a carbon electrode is impregnated with ferrous and ferric salts and $Fe_3O_4$ produced therefrom; the carbon being dried and baked at a temperature sufficient to make the $Fe_3O_4$ electrically conductive, but insufficient to produce chemical reaction between the carbon and the $Fe_3O_4$; all as more fully hereinafter set forth and as claimed.

In the electrolysis of chlorid solutions, it is usual to employ anodes of graphite. More rarely, anodes of magnetite, $Fe_3O_4$, are used; ferrosoferric oxid being melted and cast into appropriate shapes. Because of the extremely low conductivity of magnetite, it is advantageous to make these electrodes hollow and with thin walls, a better conductor being provided in the interior. The manufacture is difficult and the results not always satisfactory. But as an anode, magnetite has the great advantage that it is not in any way affected by electrically developed chlorin or oxygen. Graphite electrodes are not wholly satisfactory and particularly where oxygen-containing electrolytes are present in the solution; the difficulties being, more or less correlated with the porosity of the electrodes. Other things being equal, the less pervious is the graphite of the electrode, the more satisfactory it is in use and the longer its life.

It is the object of the present invention to combine the advantages of the two types of electrode while obviating their disadvantages. To this end, I provide a composite electrode consisting of a graphite containing fine particles of magnetite in its pores in good electrical contact with the pore walls. In so doing, I obtain a double advantage. The magnetite obstructs the graphite pores, wholly or partially, and in its fine state of division with the particles in electrical contact with the graphite, its low conductivity becomes immaterial.

The desired article can be produced by various ways of impregnating the graphite. Commonly, however, it is easier to produce the impregnation in the wet way, using a solution of iron salts, and afterwards producing a magnetic oxid therefrom in the desired anhydrous electrically conductive, chemically inert form by a drying and baking treatment. Wet or hydrated magnetic oxid, such as can be formed in the pores by precipitation of iron oxid, is readily reactive with chlorin and with acids.

In the present invention therefore, I impregnate a graphite electrode with ferrosoferric oxid in any suitable way. The oxid may, or may not, be in a hydrated form. In one way of operating, the graphite may be impregnated with vapors of $FeCl_3$ and given a slightly reducing roast at a low temperature. The chlorin is volatilized, usually as HCl, and the iron converted into oxid. A little ammonia may be used to facilitate extrication of chlorin. It is, however, generally more satisfactory to use a solution containing ferrous chlorid and ferric chlorid to impregnate the electrode, the electrode being afterward carefully dried and baked, care being taken to avoid any baking temperature which will cause reaction between the carbon and the iron oxid. It is best not to exceed 500° C. A prolonged heating at a relatively low temperature is better than a shorter heating at a higher temperature.

In a specific embodiment of the present invention, using a solution of the chlorids for impregnation, I produce a solution of the mixed chlorids in the approximate molecular ratio of $FeCl_2$ to $2FeCl_3$. It is convenient to use a solution of a density of about 40° Baumé. The graphite to be impregnated is immersed in this solution for a time under conditions facilitating its penetration within the pores of the graphite. It is convenient to put the graphite in a suitable closed tank, exhaust the air as far as practicable, and then run in the impregnating solution. The vacuum removes air from the pores and facilitates the entrance of the solution. Better impregnation can be accomplished by applying some degree of air pressure after a time and then once more exhausting. The electrodes are then removed and allowed to dry slightly, drying conditions being so regulated as to keep the salts as much as possible within the pores. After drying, the electrodes are baked at a temperature of approximately 450° C, or a dull red heat. In baking with access of air, the chlorin is removed, leaving combined ferrosoferric oxid.

What I claim is:—

1. A carbon electrode containing particles of inactive, anhydrous, electrically conductive magnetite within its pores.

2. In the manufacture of electrodes, the process which comprises impregnating a carbon electrode with iron salts in the ratio to form $Fe_3O_4$, and baking to dehydrate said $Fe_3O_4$ and convert it into an electrically conductive, chemically inactive form.

3. In the manufacture of electrodes, the process which comprises impregnating a carbon electrode with a solution containing ferrous chlorid and ferric chlorid and roasting at a low temperature to produce $Fe_3O_4$ within the pores of such carbon in an anhydrous, electrically conductive, chemically inactive form.

In testimony whereof, I have hereunto affixed my signature.

JOHN R. MACMILLAN.